US010392067B2

(12) United States Patent
Srivirat et al.

(10) Patent No.: US 10,392,067 B2
(45) Date of Patent: Aug. 27, 2019

(54) LIGHTING DEVICE STRUCTURE INCLUDING AUXILIARY ILLUMINATION

(71) Applicants: HONDA MOTOR CO., LTD., Minato-ku, Tokyo (JP); Kunakorn Srivirat, Bangkok (TH); Rungroj Saravichai, Bangkok (TH); Panita Julrat, Bangkok (TH)

(72) Inventors: Kunakorn Srivirat, Bangkok (TH); Rungroj Saravichai, Bangkok (TH); Panita Julrat, Bangkok (TH)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 15/563,249

(22) PCT Filed: Apr. 3, 2015

(86) PCT No.: PCT/TH2015/000021
§ 371 (c)(1),
(2) Date: Sep. 29, 2017

(87) PCT Pub. No.: WO2016/159893
PCT Pub. Date: Oct. 6, 2016

(65) Prior Publication Data
US 2018/0093729 A1 Apr. 5, 2018

(51) Int. Cl.
*F21V 1/00* (2006.01)
*B62J 6/02* (2006.01)
(Continued)

(52) U.S. Cl.
CPC .............. *B62J 6/02* (2013.01); *B60Q 1/0041* (2013.01); *B62K 11/04* (2013.01); *F21S 41/10* (2018.01);
(Continued)

(58) Field of Classification Search
CPC .. B62J 6/02; F21S 41/147; F21S 45/47; F21S 43/27; F21S 43/251; F21S 43/241; F21S 41/30; F21S 41/10
(Continued)

(56) References Cited

U.S. PATENT DOCUMENTS 9,593,818 B2 * 3/2017 Mochizuki .......... F21S 48/1388
2003/0142502 A1 * 7/2003 Kawai .................. B60Q 1/0035 362/475
(Continued)

FOREIGN PATENT DOCUMENTS

CN 1376872 A 10/2002
CN 1426922 A 7/2003
(Continued)

OTHER PUBLICATIONS

Extended European search report dated Apr. 23, 2018 issued in the corresponding EP patent application 15887932.0.
(Continued)

*Primary Examiner* — Matthew J. Peerce
(74) *Attorney, Agent, or Firm* — Carrier Blackman & Associates, P.C.; Joseph P. Carrier; Fulchand P. Shende

(57) ABSTRACT

A lighting device structure includes lighting sources configured to provide lighting illumination, a reflector configured to reflect lighting illumination from the lighting sources as the LED elements, an inner lens mounted to the reflector. The lighting sources, the reflector, the inner lens are housed within a housing, and an outer lens assembled to the housing. The inner lens is mounted to a front end of the reflector and comprises an overlapping portion positions between an outline wall of the reflector and the inner lens. The overlapping portion of the inner lens induces lighting illumination and illuminates the inner lens. The inner lens is mounted to the front end portion of the reflector that does not
(Continued)

obstruct to the certain lighting illumination, and comprises a pair of arms which extended closely to the lighting source, such that the inner lens can induce and illuminate itself as the auxiliary light.

9 Claims, 10 Drawing Sheets

(51) Int. Cl.

| | |
|---|---|
| ***B60Q 1/00*** | (2006.01) |
| ***B62K 11/04*** | (2006.01) |
| ***F21S 41/30*** | (2018.01) |
| ***F21S 41/10*** | (2018.01) |
| ***F21S 43/27*** | (2018.01) |
| ***F21S 43/241*** | (2018.01) |
| ***F21S 43/251*** | (2018.01) |
| *F21Y 115/10* | (2016.01) |
| *F21W 107/17* | (2018.01) |

(52) U.S. Cl.
CPC ............. *F21S 41/30* (2018.01); *F21S 43/241* (2018.01); *F21S 43/251* (2018.01); *F21S 43/27* (2018.01); *F21W 2107/17* (2018.01); *F21Y 2115/10* (2016.08)

(58) Field of Classification Search
USPC .......................................................... 362/509
See application file for complete search history.

(56) References Cited

U.S. PATENT DOCUMENTS

| | | | |
|---|---|---|---|
| 2006/0077677 A1 | 4/2006 | Yamaguchi et al. | |
| 2010/0246205 A1* | 9/2010 | Tanaka ................. | B60Q 1/0041 362/544 |
| 2011/0228549 A1 | 9/2011 | Lindsay et al. | |
| 2015/0023039 A1 | 1/2015 | Seo et al. | |

FOREIGN PATENT DOCUMENTS

| | | | |
|---|---|---|---|
| CN | 1760077 | A | 4/2006 |
| CN | 101846279 | A | 9/2010 |
| DE | 101 158 68 | A1 | 10/2002 |
| DE | 10 2007 019 687 | A1 | 10/2008 |
| EP | 1 912 017 | A1 | 4/2008 |
| JP | 2003-257222 | A | 9/2003 |
| JP | 2011-028932 | A | 2/2011 |
| JP | 2015-044504 | A | 3/2015 |

OTHER PUBLICATIONS

PCT/ISA/210 from PCT/TH2015/000021.
Office Action issued in the corresponding Chinese Patent Application 2015800785531 with the English translation thereof and dated Jan. 31, 2019.

* cited by examiner

LIGHTING DEVICE STRUCTURE INCLUDING AUXILIARY ILLUMINATION

FIELD OF THE INVENTION

The present invention relates to a lighting device structure, in particular a lighting device structure for a two wheeler such as a motorcycle.

BACKGROUND OF THE INVENTION

Lighting device is an essential component of a vehicle including a two wheeler such as a motorcycle as it increases visibility for riding during day time, low visibility conditions or night time.

Japanese patent publication no JP201128932 disclosed an inner-lens mounting structure comprising connecting hooks 16 formed of a plurality of legs of which are formed on an outer periphery of the inner-lens 6. The connecting hooks 16 are inserted and engaged to engaging holes 11 formed on a reflector 2. A structure for fixing the inner-lens is adopted by fitting the connecting hooks 16 of the inner-lens 6 insert therein and connect with the engaging holes 11 at a peripheral surface of the reflector 2 which is the main reflecting surface.

However, by such arrangement wherein the inner-lens is mounted to the reflecting surface by the hooks and holes formed on the reflecting surface, it disturbs reflecting light of the lighting structure.

Therefore, it is an objective of the present invention to provide a better lighting device structure which does not disturb reflecting light as well as to provide auxiliary illumination.

SUMMARY OF THE INVENTION

The present invention aims to provide an alternative lighting device structure which does not disturb lighting illumination of lighting sources while further provides auxiliary illumination with enhanced aesthetic appearance.

In an embodiment as disclosed in claim 1, the lighting device structure comprising a lighting source configured to provide a lighting illumination, a reflector configured to reflect said lighting illumination from said lighting source, an inner lens mounted to said reflector wherein said lighting source, said reflector, said inner lens are housed within a housing, and an outer lens assembled to said housing characterized in that said inner lens mounted to a front end portion of said reflector and comprises an overlapping portion positions between and outline wall of said reflector and said inner lens where said over lapping portion of said inner lens induces said lighting illumination and illuminates said inner lens. As the inner lens is mounted and located to the front end portion of the reflector, it does not affect certain lighting distribution of lighting source. Thus, this provides better illumination of lighting source. Further, as the overlapping portion does not affect lighting distribution, it enables inner lens to lead light from lighting source to illuminate itself without decreasing of illumination of lighting source.

In an embodiment as disclosed in claim 2, in the lighting device structure of claim 1, a characteristic in that said lighting sources comprises an upper lighting source and a lower lighting source which provide separate low beam light and high beam light in upper and lower positions to a respective a low beam device and a high beam device, wherein said overlapping portion of said inner lens is positioned at said low beam device. Further, said inner lens also comprises an extending base which extends downwardly toward said high beam device and leads said lighting illumination to itself and illuminates said high beam device. In principle, low beam light is mainly used while high beam light is rarely used. Therefore, the extending base of the inner lens can illuminate itself once the low beam light is turned on. Such that the extending base can lead lighting illumination from the low beam device to the high beam device and enables to make the high beam device illuminates.

In an embodiment as disclosed in claim 3, in the lighting device structure of claim 2, a characteristic in that said reflector comprises an upper reflecting portion and a lower reflecting portion which reflects said lighting illumination of said upper lighting source and said lower lighting source of said lighting source in respectively. Said reflector further comprises a connecting portion which separates said upper reflecting portion from said lower reflecting portion. As the reflector is separated into upper reflecting portion and lower reflecting portion for separating and reflecting lighting illumination of the upper lighting source and lower lighting source, a connecting portion which is position between the upper lighting source and the lower lighting source also provides an appearance of separate look for both lighting sources in vertical vision such that the low beam headlight is clearly apart from high beam headlight. Thus, it is possible to make the headlight bigger despite that the lighting source is from LED lighting elements. The connecting portion of the reflector also serves to facilitate mounting of the reflector.

In an embodiment as disclosed in claim 4, in the lighting device structure of claim 3, a characteristic in that said upper lighting source and the lower lighting source which comprise a pair of spaced-apart low beam LED elements which arranged separately in horizontal direction and a pair of spaced-apart high beam LED element which arranged separately in the same manner as with said pair of the low beam LED elements, wherein said upper reflecting portion and said lower reflecting portion further comprise a vertical ridge running vertically at the center of said reflector such that said vertical ridge appears to separate said reflector at said upper reflecting portion and said lower reflecting portion into left and right chambers. As the vertical ridge appears to separate the upper reflecting portion and the lower reflecting portion into left and right chambers it results in all lighting source of the lighting device appear to be separate from each other and provides separate illumination even when a single reflector is used. Thus, an appearance of having a dual headlight in a motorcycle is achieved with a single headlight.

In an embodiment as disclosed in claim 5, in the lighting device structure of claim 2, a characteristic in that said headlight comprises a headlight cover and a pair of headlight side covers which are dimensioned to cover the front side of said headlight and the left and right side of said headlight cover respectively. Said headlight cover is structured to define a low beam window and a high beam window and a groove portion forms horizontally to separate said low beam window from said high beam window. As the headlight cover comprises low beam and high beam windows for transmitting lighting through these windows, the groove portion which formed between both windows provides a clearer appearance of separation of low beam and high beam light when seen in front view due to existence of the groove portion.

In an embodiment as disclosed in claim 6, in the lighting device structure of claim 3, a characteristic in that said inner lens and said reflector are mounted to said housing by a single fastening means at said connecting portion of said reflector and at said extending base of said inner lens. With this design and arrangement where the connecting portion of the reflector provide a mounting mechanism by its own structure, it enables to get the most benefit out of the connecting portion by using only a single fastening means to engage the inner lens, the reflector and the housing together.

In an embodiment as disclosed in claim 7, in the lighting device structure of claim 6, a characteristic in that the lighting device structure further comprises a housing holder configured to conceal the clearance between said housing and said lower reflecting portion to hide from view the components and elements installed therein. Said housing holder is coupled to said inner lens, said reflector and said housing by said single fastening means. With this embodiment, the housing holder is function to not only conceal the internal structure of the headlight, it also function as mounting portion to mount the inner lens, the reflector and the housing together by using only one fastening means, thus minimized the number of mounting portion and mounting means as well.

In an embodiment as disclosed in claim 8, a lighting device structure comprises a lighting source configure to provide a lighting illumination, a reflector configured to reflect said lighting illumination from said lighting source, an inner lens mounted to said reflector, wherein said lighting source, said reflector and said inner lens are housed within a housing and an outer lens is coupled to said housing. Characterized in that, said reflector comprises a reflecting portion configured to reflect said lighting illumination and provide certain functional light distribution. Said reflector also comprises a front bottom end portion which is integrally formed with said reflecting portion where said inner lens is mounted to said front bottom end portion of said reflector and illuminates by inducing said lighting illumination of said lighting source. As the inner lens is positioned at the front bottom end portion of the reflector, it would not disturb or obstruct lighting illumination of the lighting source. Therefore, the lighting source can maintain certain lighting illumination, and thus allows the inner lens to illuminate by inducing light from the lighting source and function as auxiliary and/or accessory light.

In a further embodiment as disclosed in claim 9, in the lighting device structure of claim 1 or 8, a characteristic in that said lighting source comprises an LED elements mounted to a printed circuit board, wherein said printed circuit board is horizontally arranged above said reflecting portion, and said LED element is faced down to said reflecting portion for projecting said lighting illumination forward upon reflected by said reflector. By using LED element as lighting source, it is possible to lower power consumption and with longer life cycle while taken less space in comparison to a normal light bulb. Accordingly, to provide auxiliary or accessary light even LED headlight does not have much leakage light. Further, as the printed circuit board is arranged horizontally above the reflecting portion, it enables to view the accessory or auxiliary light well while hiding the visibility of LED element from top view.

In a further embodiment disclosed in claim 10, in the lighting device structure of claim 8, a characteristic in that said inner lens comprises a base and a pair of arm extending from the left and right of said base reaching toward said lighting source projected above to induce said lighting illumination. As the inner lens is mounted to the front bottom end portion of the reflector it enables the inner lens to induce the lighting illumination from the lighting source through the arms of the inner lens which is positioned closely to the lighting source.

BRIEF DESCRIPTION OF DRAWINGS

The principle of the present invention and its advantages will become apparent in the following description taking in conjunction with the accompanying drawings in which.

DETAILED DESCRIPTION OF EMBODIMENTS OF THE INVENTION

The present invention discloses a lighting device structure with auxiliary illumination for a motorcycle which provides optimum lighting illumination and light-distribution which can be described by the followings.

FIGS. 1-7A show a first embodiment of the lighting device structure 15, according to the principle of the present invention.

Figure 1:
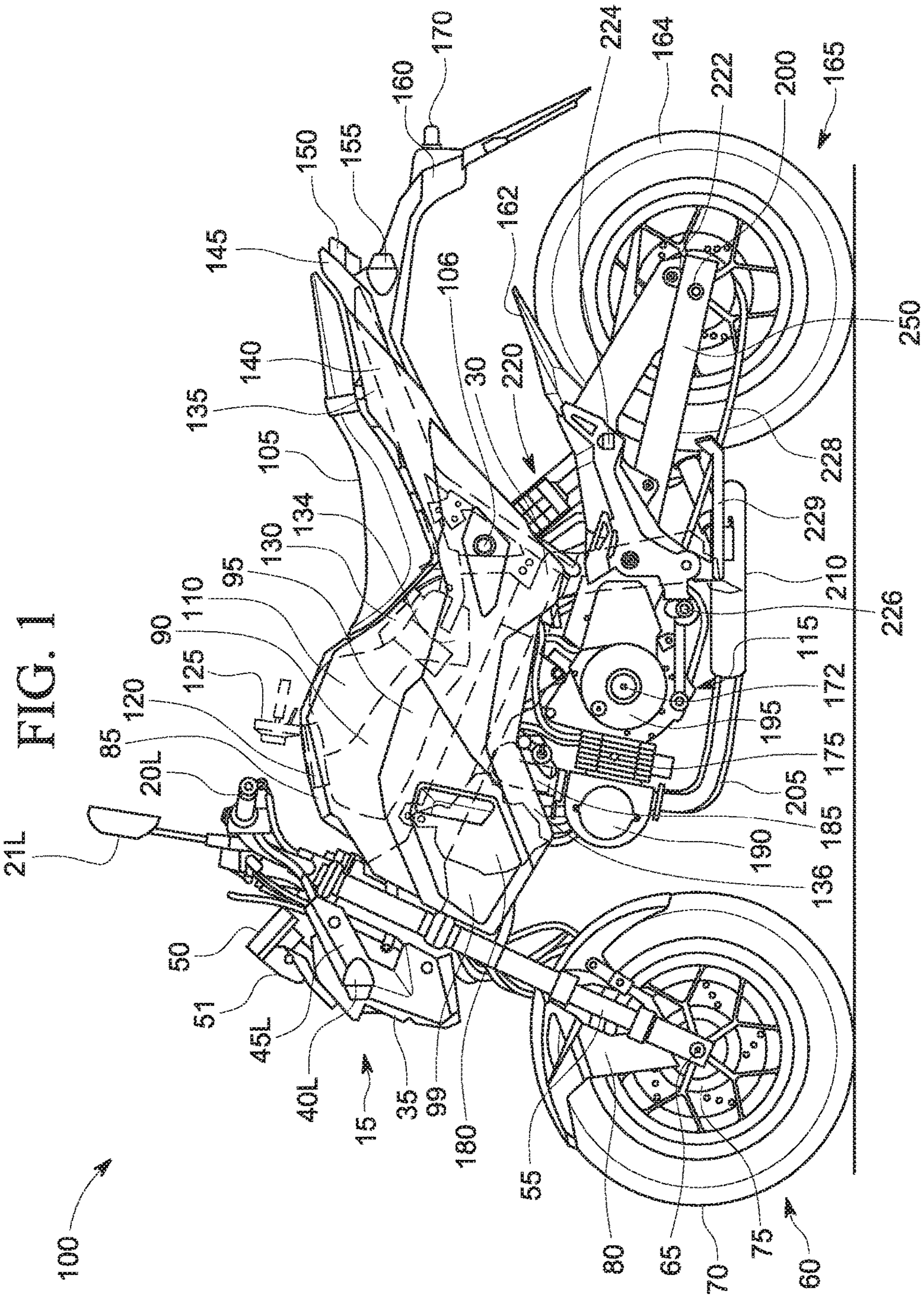
FIG. 1 shows a left side view of a motorcycle comprising an embodiment of a lighting device structure according to the principle of the present invention.
Figure 2:
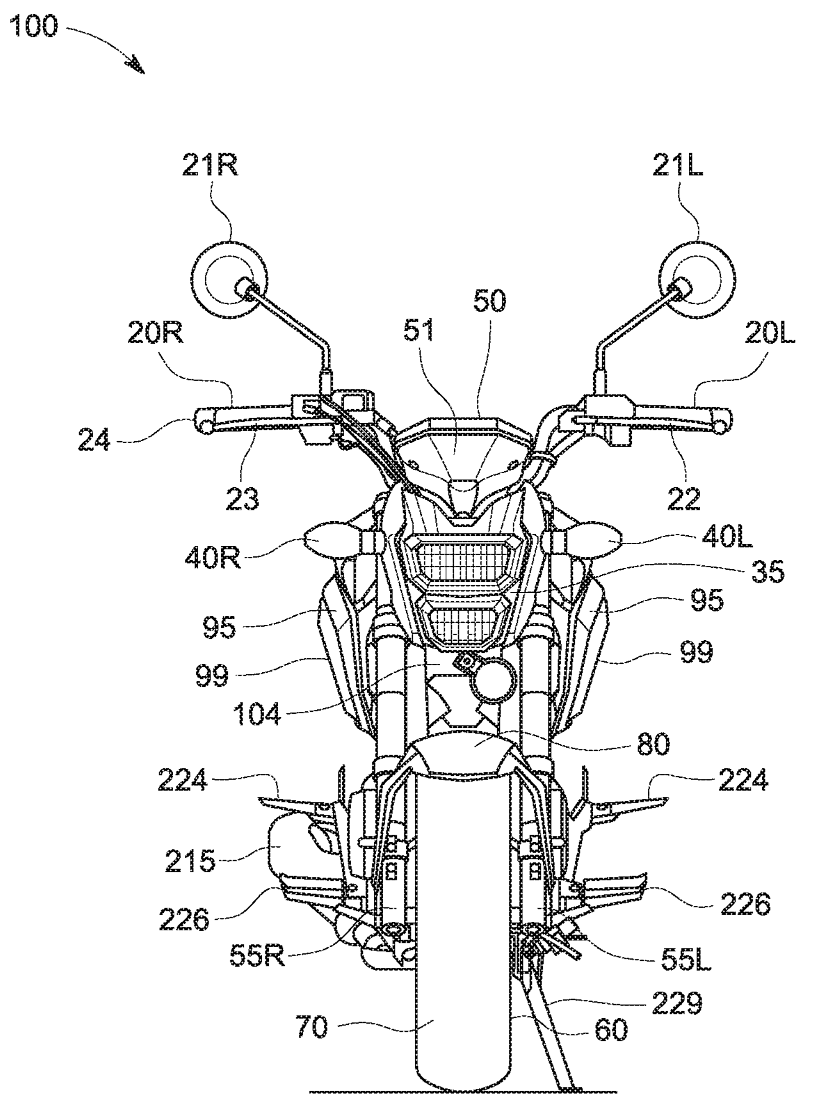
FIG. 2 shows a front view of a motorcycle comprising an embodiment of a lighting device structure according to the principle of the present invention.

In more detail, FIGS. 1-2 show a left side view and a front view, respectively, of a motorcycle 100 comprising an embodiment of a lighting device structure 15 according to the principle of the present invention. In this exemplary example, the lighting device structure 15 is assembled to a front section of a motorcycle 100.

The motorcycle 100 constitutes a pair of handle grips 20L,R steerably connecting to a pair of front forks 55L,R mounted on a body frame 30 extending in a rearward direction of a motorcycle body. Adjacent to a pair of handle grips 20L,R, a pair of rear view mirrors 21L,R are mounted. Also at the front of the left handle 20L, is a clutch lever 22 is designed, whereas at the front of the right handle 20R, a rear brake lever 23 is designed and a throttle 24 are coupled on the right handle grip 20R.

A headlight 35 is covered with a head light cover 600 and a pair of headlight side covers 45L,R where a pair of winker lights 40L,R are mounted to by a pair of mounting portions 46L,R, and mounted to a front section of the motorcycle 100 below a meter 50 having a meter cover 51 affixed thereto.

The body frame 30 supports a pair of front forks 55L,R to enable steering of a front wheel 60 at a front axle 65; the front wheel 60 is equipped with a front tire 70 and a disk brake rotor 75 at right side of the front tire 70 to allow controlling rotation of the front wheel 60. The front wheel 60 is of a small size as that of a rear wheel 165, i.e. 10-12 inched which are suitable for a small motorcycle; a front fender 80 designed to block dirt or debris picking up by the rotation of the front wheel 60 is positioned above the front wheel 60 and between the pair of the front forks 55L,R. The body frame 30 supports a fuel tank 110 which stores and supplies fuel to an engine system 115 hanged at a lower portion of the mid-section of the body frame 30; the fuel tank 110, which is located toward the front of the vehicle between the headlight 35 and a seat 105 of which supported on a seat frame 140, includes a fuel receiving inlet 120 for receiving fuel, a fuel lid 125, and a fuel pump 130 installed into the fuel tank 110.

The motorcycle 100 is covered by a combination of body covers that provide cover for the internal structures and elements of the motorcycle 100, including a center cover 85 that covering upper portions of fuel tank 110 and fuel receiving inlet 120, a pair of side upper covers 90, a pair of side covers 95 of which may optionally include a pair of garnishes 99, a pair of side lower covers 105, a pair of side rear cover 134, and a pair of side rear upper covers 135. A seat key cylinder 106 is installed on the left side lower cover 136 surrounded by left side rear cover 134L as to provide access to an underside of the seat 105.

Continuous with the seat frame 140 are a rear grip 145 of which provide grips for a passenger, a tail light 150 and a pair of rear winker lights 155, a rear fender 160 suspended above a rear tire 164 and a license light 170 disposed on the rear fender 160. The rear fender 160 is designed to block dirt and debris picking up by the rear wheel 165 from travelling further or spray onto the rider or the passenger. Inner rear fender 162 will also supplementary provide the same affects.

The engine system 115 being 4 stroke type small engine and under 200 cc capacity as small engine includes a cylinder bloc 175 connecting to a cylinder head 90 which is connected to an engine intake system with an air cleaner 180 which supplies filtered air to a throttle body 185 which includes an injector and throttle valves, a crank case 195 supports the cylinder 175 in manner for inclining the axis of cylinder bloc 175 forwardly, similar to the horizontal. This horizontal engine layout is also suitable for a small motorcycle because of its small wheel size. The engine system 115 generates drive force which is delivered to the rear wheel 165 by a drive chain 228. Exhaust from the cylinder head 190 is directed to an exhaust system also connected to the cylinder head 190 and into an exhaust pipe 205 leading to an exhaust chamber 210 and subsequently to a muffler 215 directing toward the rear of the motorcycle 100.

As generally known in the art, the suspension components of a motorcycle 100 comprise of front forks 55L, R on the front of the motorcycle 100 and a rear cushion unit 220 on the rear of the motorcycle 100 to absorb road conditions and provides a comfortable ride. The swing arm 250 on the rear of the motorcycle 100 functions as a base for mounting of a rear axle 200 and assembly of the rear wheel 165, having the rear tire 164 assembled thereto, at the rear axle 200. The rear wheel 165 is pulled by the chain 228. A pair of passenger step 224 and a pair of rider steps 226 are also provided for comfort of the rider and the passenger respectively are disposed behind the engine system 115. A side stand 229 is provided on the left side of the motorcycle 100 to support the motorcycle 100 when parked.

Figure 3:
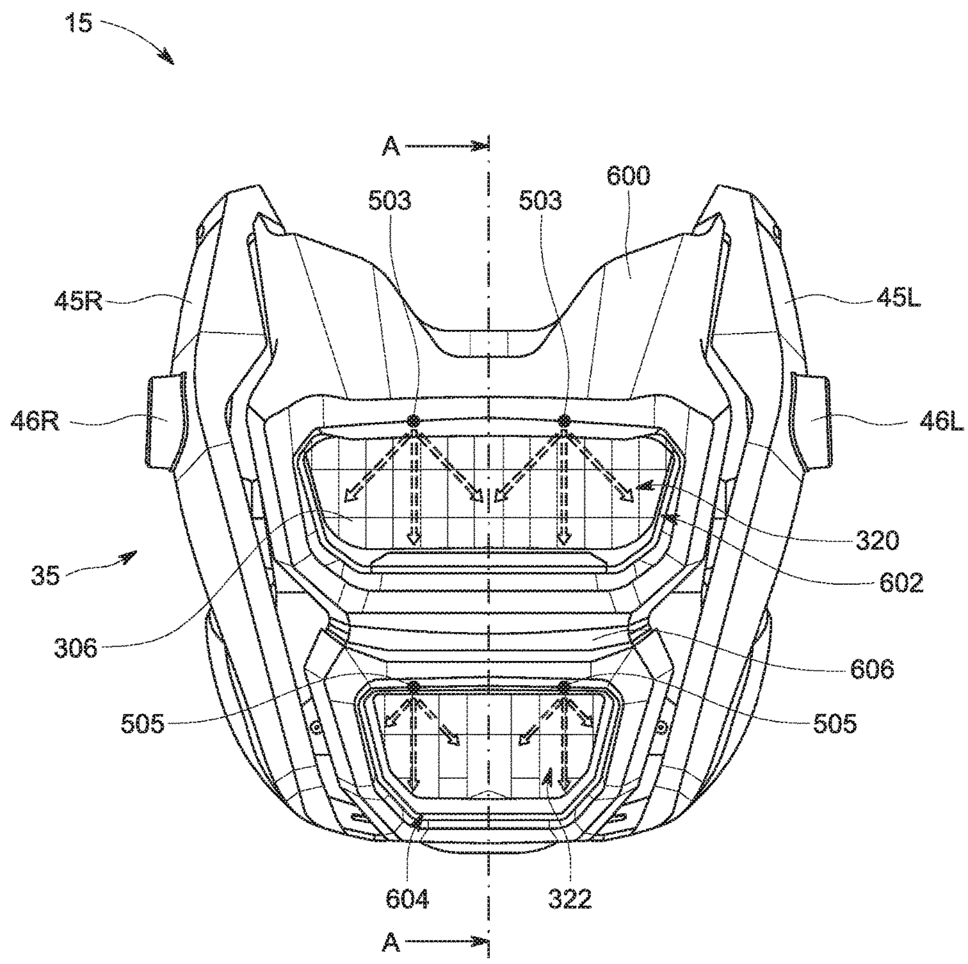
FIG. 3 shows a front view of an embodiment of a lighting device structure according to the principle of the present invention.
Figure 4:
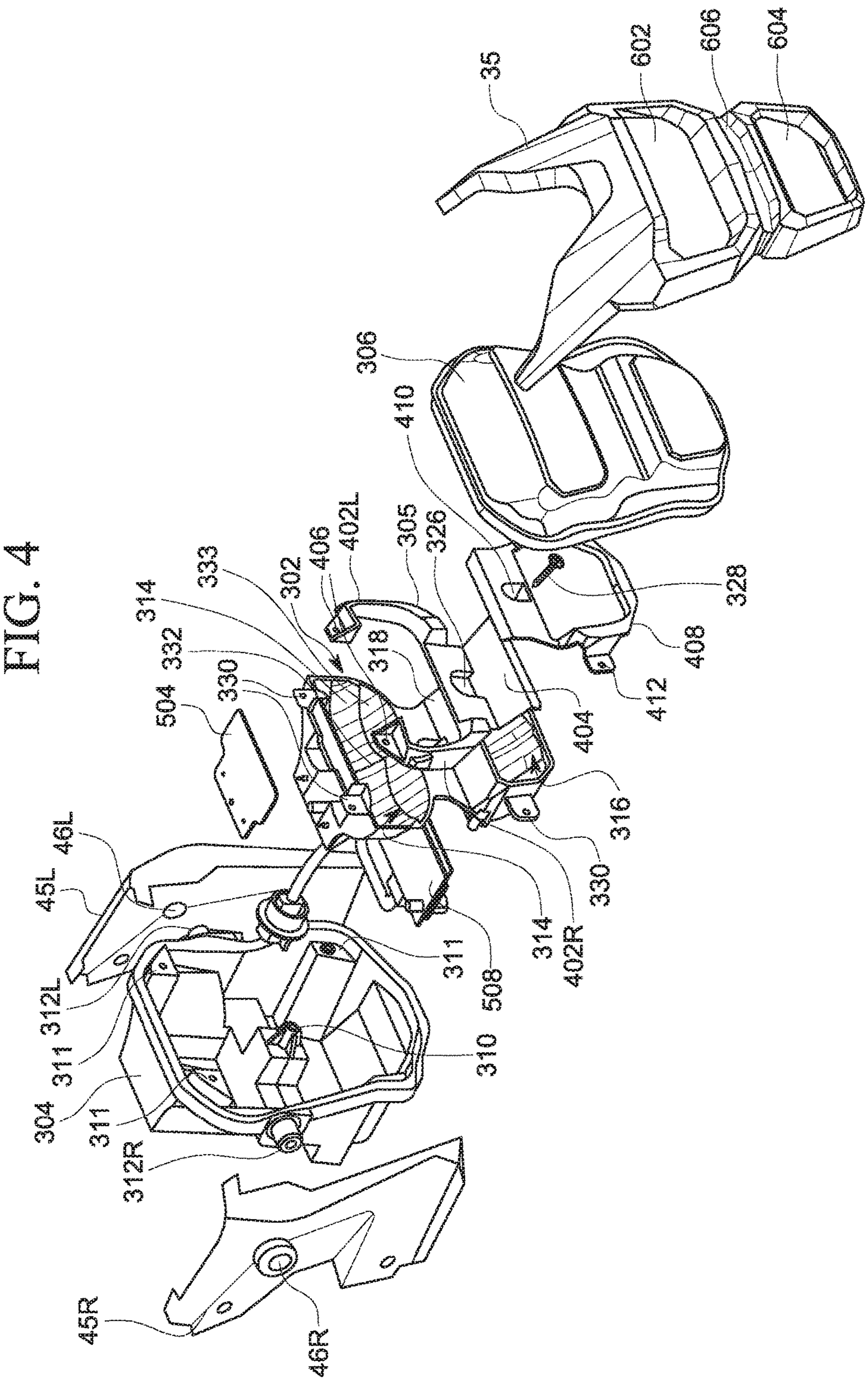
FIG. 4 shows an exploded-view of the embodiment of the lighting device structure of FIG. 3.

Now, turning to the lighting device structure 15 according to the present invention, in more detail as shown in FIGS. 3 and 4, the lighting device structure 15, according to this embodiment comprising a housing 304 which houses lighting sources as the LED lighting elements 503 and 505, a reflector 302, an inner lens 305, and an outer lens 306 assembled to the housing 304 forming the lighting device structure 15 of the motorcycle 100. The lighting sources as the LED lighting elements 503 and 505 are configured to provide lighting illumination (showing as the arrow dash lines, for example, in FIG. 3) and the reflector 302 having the inner lens 305 mounted thereon is configured to reflects lighting illumination from the lighting sources. The lighting sources, the reflector 302 and the inner lens 305 are mounted and housed within the housing 304 and the outer lens 306. More specifically, the inner lens 305 is mounted to a front end portion of the reflector 302, more specifically the inner lens 305 is mounted at the front end portion of a upper reflecting portion 314 of the reflector 302 and includes an overlapping portion 308 positions between an outline wall of the reflector 302 and the inner lens 305 wherein the inner lens 305 induces the lighting illumination and illuminates itself structure.

In more detail, in the example as shown in FIG. 4, the housing 304 is dimensioned to define a cavity for which the reflector 302 and the inner lens 305 can be fitted therein. In an exemplary embodiment, the housing 304 comprises a center mounting boss 310 and a plurality of mounting inlets 311 for receiving mounting of the reflector 302 and the inner lens 305 to the housing 304. Both of the reflector 302 and the inner lens 305 are also provided with corresponding mounting portions.

As also shown in FIG. 4, the reflector 302 defines reflecting portion configured to reflect lights from the lighting sources. The reflecting portion extends downward and forward so as to forwardly reflect lights ahead of the motorcycle 100. In an example, the reflector 302 defines an upper reflecting portion 314 and a lower reflecting portion 316 and further comprising a connecting portion 318 wherein the lower reflecting portion 316 connects to the upper reflecting portion 314 via the connecting portion 318. The connecting portion 318 further separates the upper reflecting portion 314 from the lower reflecting portion 316 which functions as low beam function and high beam function respectively for the motorcycle. The connecting portion 318 also defines a reflector mounting recess 324 with a through hole A, preferably at the center corresponding to an inner lens mounting recess 326 with a through hole B provided on the inner lens 305 such that it allows fastening of the inner lens 326 and the reflector 302 to the housing 304, at the mounting boss 310 with a single fastening member, such as a screw 328. As the inner lens 326, the reflector 302 and the housing are fastened together with a single screw 328. The reflector 302 is also prepared with a plurality of mounting wings 330 which allows fastening of the reflector 302 to the housing 304 at the corresponding mounting inlets 311 prepared on the housing 304. The front end of reflector 302 is configured to overlap with a pair of overlapping arms 402L,R of the inner lens 305 once the inner lens 305 is mounted to the reflector 302.

Moreover, the reflector 302 also comprises a vertical ridge 332 running vertically at center of the reflector 302 such that it appears that the ridge 332 separates the reflector 302, including the upper reflecting portion 314 and the lower reflecting portion 316 as well as a pair of spaced-apart low-beam LED elements 503 and a pair of spaced-apart high-beam LED element 505 into left and right reflecting chambers so as to enhance a wider light distribution from left to right.

Figure 6:
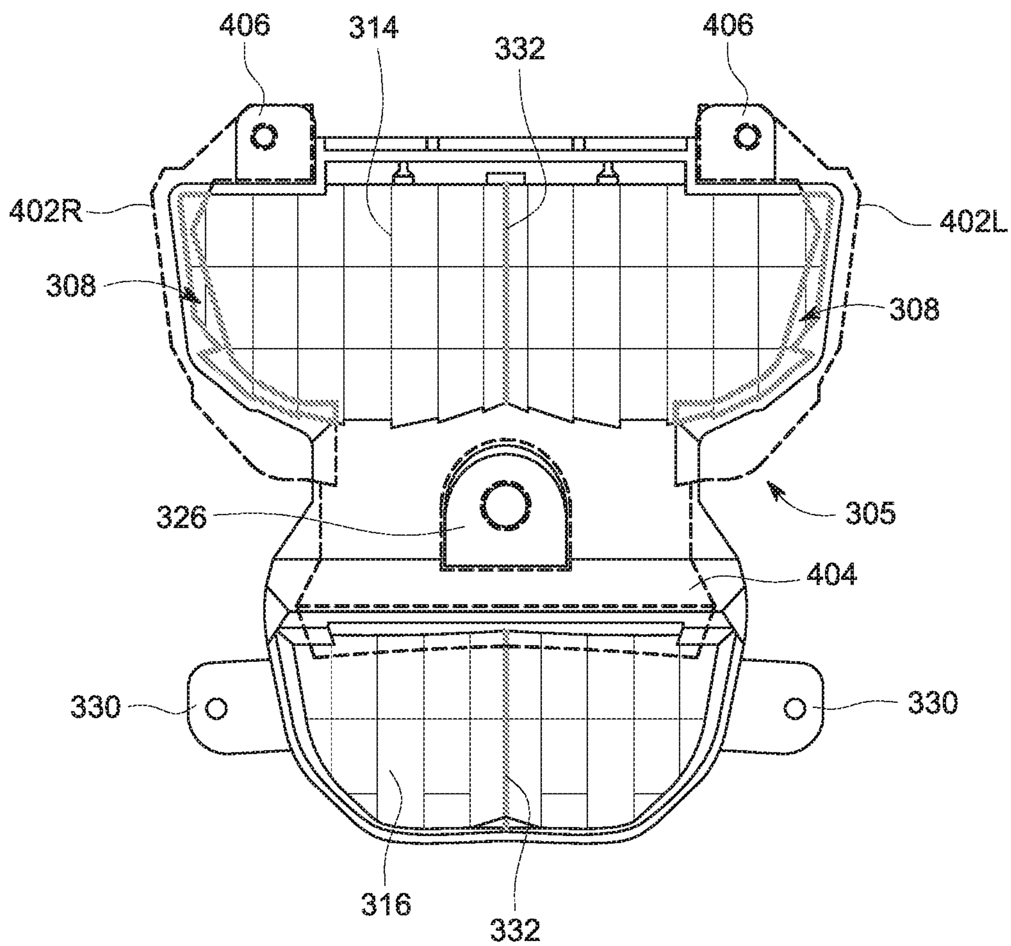
FIG. 6 shows a front view of an embodiment of a lighting device structure according to the principle of the present invention illustrating an exemplary arrangement of reflector and inner lens which are mounted together.

The inner lens 305 as shown as example in FIG. 6 comprises an extending base 404 of which is dimensioned to correspond to the connecting portion 318 of the reflector 302 and extends downwardly toward a high beam device 322 where the lower reflecting portion 316 of the reflector 302 is located. At the center of the base 404 of the inner lens 305, as discussed above, is provided with the mounting recess 326 with a through hole B so as to allows fastening of the inner lens 305 to the reflector 302. Also, as mentioned above, the inner lens 305 comprises a pair of left and right overlapping arms 402L,R extending upwardly from the base 404 to the left and right of the base 404 such that the over lapping arms 402L, R overlap with both sides of front end of the reflector 302 such that lighting illumination is transmitted to the overlapping arms 402L,R of the inner lens 305 and illuminate the over lapping arms 402L,R and all unit of the inner lens 305. Preferably, the overlapping arm 402L,R of the inner lens 305 has a thickness greater and wider than that of a thickness of the overlapping front end of the reflector 302, In other words, overlapping portion of the reflector 302 has a thickness that is less and narrower than the thickness of the overlapping arm 402L,R of the inner lens 305 At each terminal end of each of the overlapping arms 402L,R there is provided a mounting port 406 at a position corresponding to the position of the mounting inlets 311 on the top portion of the housing 304 as well as the mounting wings 330 on the upper reflecting portion 314 of the reflector 302, such that once the mounting port 406 on the overlapping arm 402L,R, the mounting wings 330 on the upper reflecting portion 314 and the mounting inlets 311 on the housing 304 are all aligned to one another, it able to receive a respective fastening means for supplementary securing the inner lens 305, the reflector 302 to the housing 304.

Figure 5:
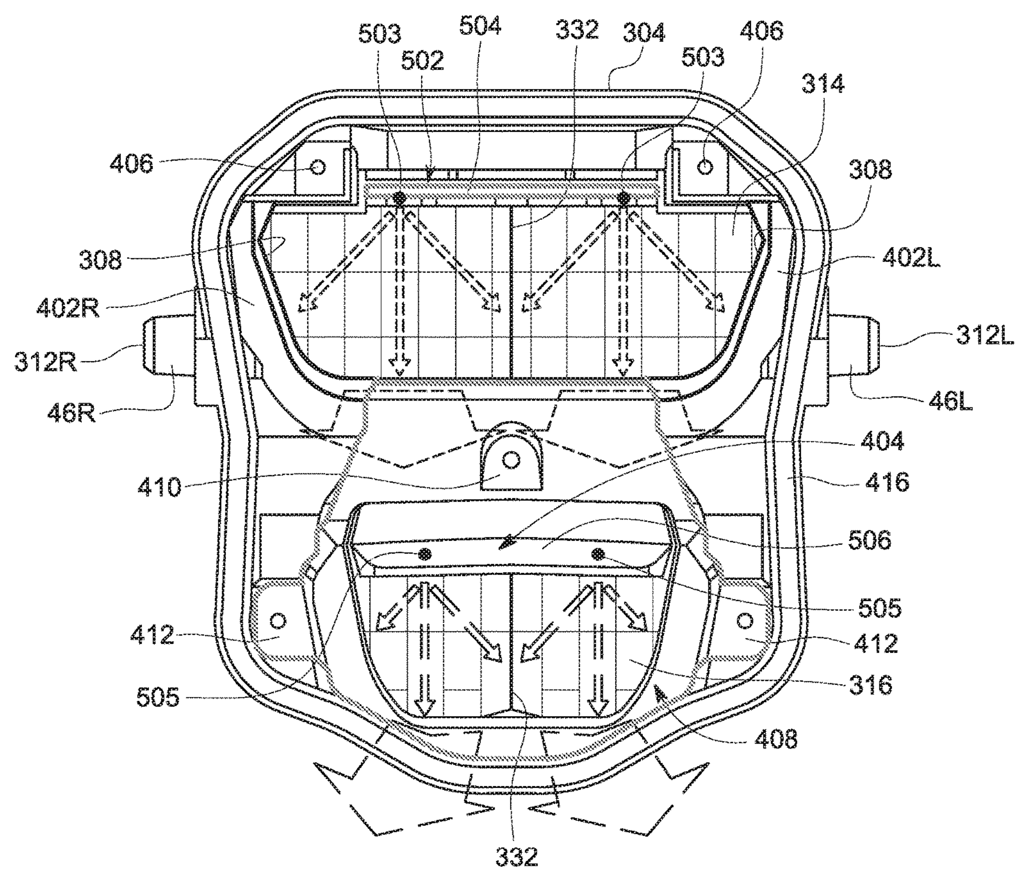
FIG. 5 shows a front view of an embodiment of a lighting device structure according to the principle of the present invention illustrating an exemplary arrangement of its various components with an outer lens having been taken off.

Also to reinforce mounting of the inner lens 305 and the reflector 302 to the housing 304, the lighting device structure 15 also comprises an extension housing holder 408, as shown FIG. 4 and FIG. 5, configured to couple to the front of the inner lens 305 so as to mount the inner lens 305, the reflector 302 to the housing 304 via a backwardly projected mounting guide 410 prepared on the extension housing holder 408 wherein the mounting guide 410 is fitted into the mounting recess 326 of the inner lens 305 so as to permits fastening of the extension housing holder 408, the inner lens 305, the reflector 302 to the housing 304. The extension housing holder 408 also includes a side mounting flange 412, one each to the left and right of the extension housing holder 408 wherein the side mounting flange 412 overlay the mounting wing 330 on the reflector 302 such that it receives fastening element such as a screw so as to secure itself as well as the reflector 302 to the housing at the respective mounting inlets 311 on the lower section of the housing 304. The extension housing holder 408 is also configured to conceal clearance between the housing 304 and the high beam device 322 to hide from view the components and elements installed therein to improve aesthetic appearance of the structure.

Figure 7A:
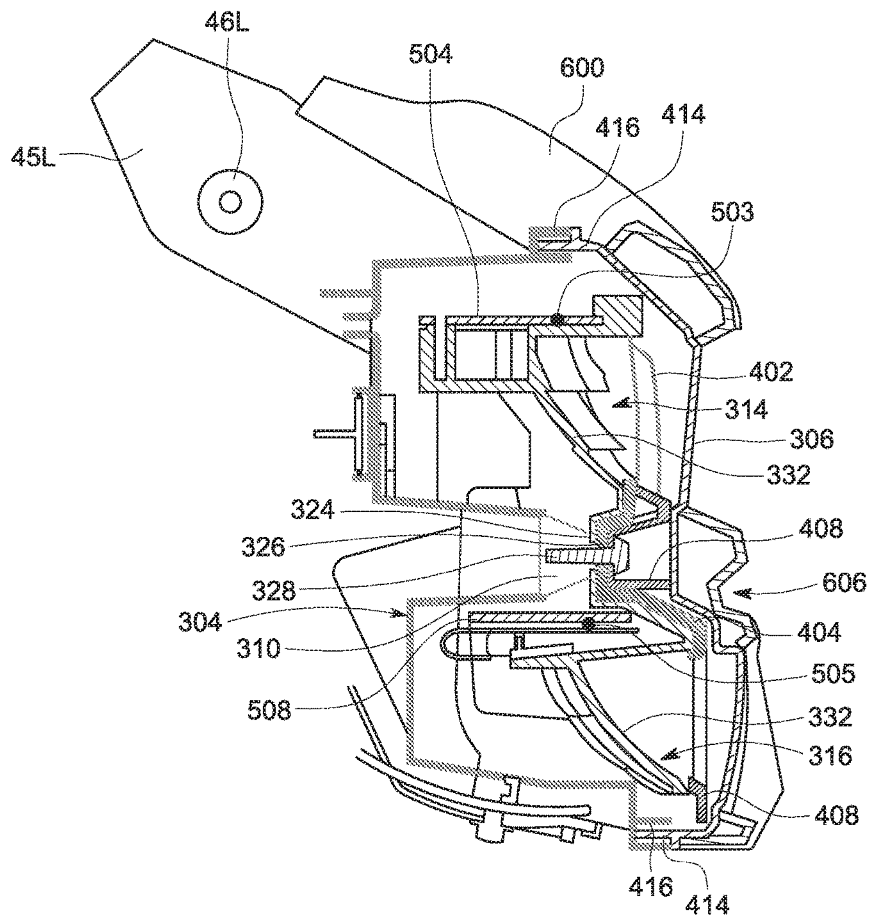
FIG. 7A shows a right A-A sectional view of a lighting device structure according to the principle of the present invention.
Figure 7B:
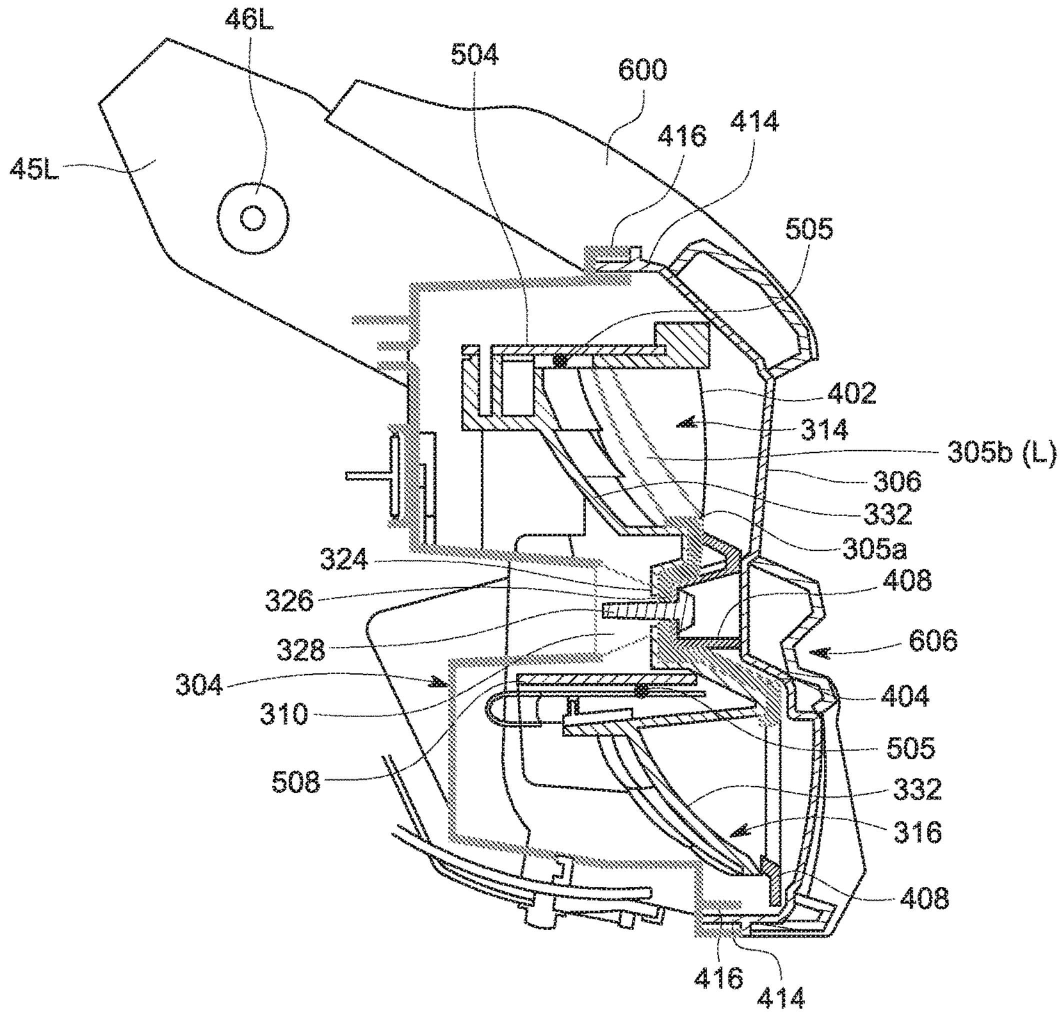
FIG. 7B shows a right A-A sectional view of a lighting device structure in a second structure according to the principle of the present invention.

In FIGS. 4, 7A and 7B, the outer lens 306 is dimensioned to correspond with the dimension and configuration of the housing 304 such that it can be coupled onto the housing 304 to contain and provide protection to the components installed inside the housing 304. The outer lens 306 is coupled to the housing 304 along its peripheral flange or at least at a specified portion thereof wherein the peripheral flange of the outer lens 306 or at least at specified locations thereof is prepared with protruding edge portions 414 which are designed to be snuggly fitted inside a groove portion 416 prepared along the edge of the housing 304, thereby securing the outer lens 306 to the housing 304.

As discussed above, the lighting device structure 15 according to the present invention comprises a plurality of lighting sources. The lighting sources being LED elements electrically mounted to a corresponding Printed Circuit Board (PCB) projected above the upper reflecting portion 314 and the lower reflecting portion 316 of the reflector 302, and reflected outwardly and forwardly as the reflector 302 is constructed to extend downwardly and forwardly as earlier described.

In an example as shown in FIGS. 4, 5, 7A and 7B, the lighting sources comprises an upper lighting source 502 connected to an upper PCB 504 and a lower lighting source 506 connected to a lower PCB 508. The upper lighting source 502 comprises a pair of low beam LED elements 503L,R which projects low beam light onto the upper reflecting portion 314 of the reflector 302 to provide low beam function of the headlight 35, whereas the lower lighting source 506 comprises a pair of high beam LED elements 505L,R which project high beam light onto the lower reflecting portion 316 of the reflector 302 to provide high beam function of the headlight 35. As shown in FIG. 5, each of the low beam LED element 503 of the pair is spaced-apart in the left and right directions of the upper reflecting portion 314 which is separated by the vertical ridge 332 and similarly, each of the high beam LED element 505 is also spaced-apart in the left and right directions of the lower reflecting portion 316 which also share the vertical ridge 332, thus this lighting device structure 15 seems like a dual headlight.

To complete the installation, the lighting device structure 15 according to the present invention also comprises a headlight cover 600 and a pair of headlight side covers 45L,R mounted to the lighting device structure 15. The headlight cover 600 is dimensioned to cover the front side of the headlight 35. To correspond with the structure and the designation of the low beam and high beam configuration of the headlight 35, the headlight cover 600 is also structured to define a low beam window 602, a high beam window 604 and a groove portion 606 forms horizontally as to separate the low beam window 602 from the high beam window 604.

Further, the lighting device structure 15 also comprise a headlight cover 600 and a pair of headlight side covers 45L,R. The headlight side cover 45L,R comprises a pair of mounting arms 46L,R, disposed on the left and right side of the headlight side cover 45L,R respectively for receiving coupling one each of the front winker light 40 thereon.

As described, the lighting device structure 15 comprises lighting sources of which includes the upper lighting source 502 and the lower lighting source 506 which provide lighting illumination and the reflector 302 defining the upper reflecting portion 314 and the lower reflecting portion 316 which reflects lighting illumination from the upper lighting source 502 and the lower lighting source 506. As the reflector 302 further comprises the extending connecting portion 318 wherein the lower reflecting portion 316 connects to the upper reflecting portion 314 via the extending connecting portion 318, the extending connecting portion 318 separates therein which functions as low beam device and high beam device of the headlight respectively for the motorcycle 100. Further, as the inner lens 305 is positioned at the low beam device and the overlapping portion 308 by overlapping of the reflector 302 and the overlapping arms 402L,R of the inner lens 305 which has greater and wider thickness than the thickness of reflector 302, the inner lens 305 leads light from the upper lighting source 502 and illuminate blue light at low beam device 320. Due to the presence of the extending base 404 at the inner lens 305 as the low beam device 320 is turned on, the base 404 leads light to itself and illuminates blue light along the extending base 404 at the high beam device 322, but with lower lighting intensity than the low beam device and can be seen when the high beam device 322 is not turned on.

Figure 8:
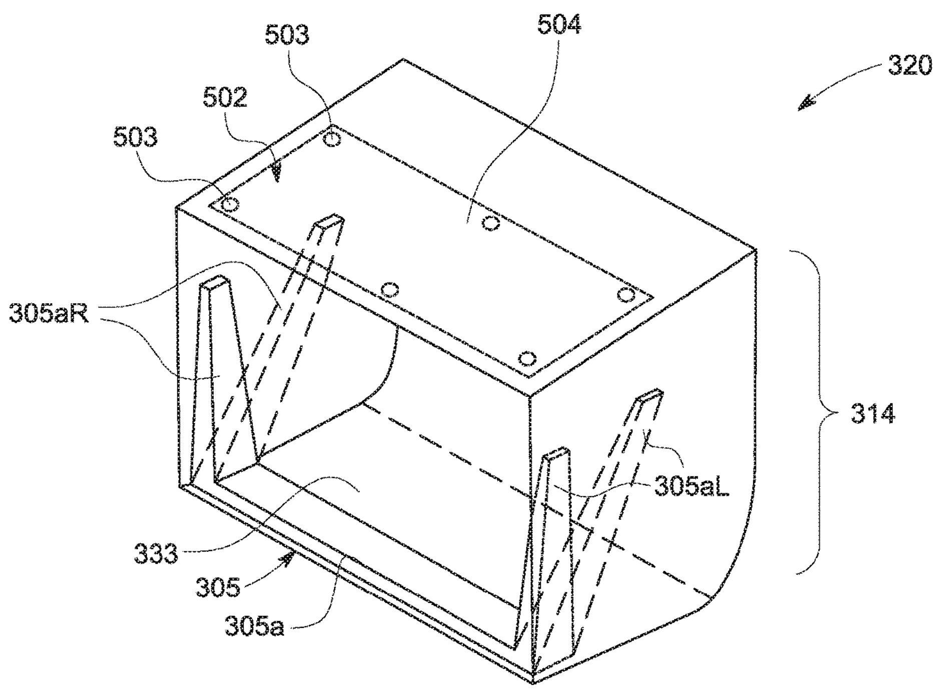
FIG. 8 shows a side-front perspective view of an arrangement of a reflector, an inner lens and a light source of a lighting device structure in a second structure according to the principle of the present invention.
Figure 9:
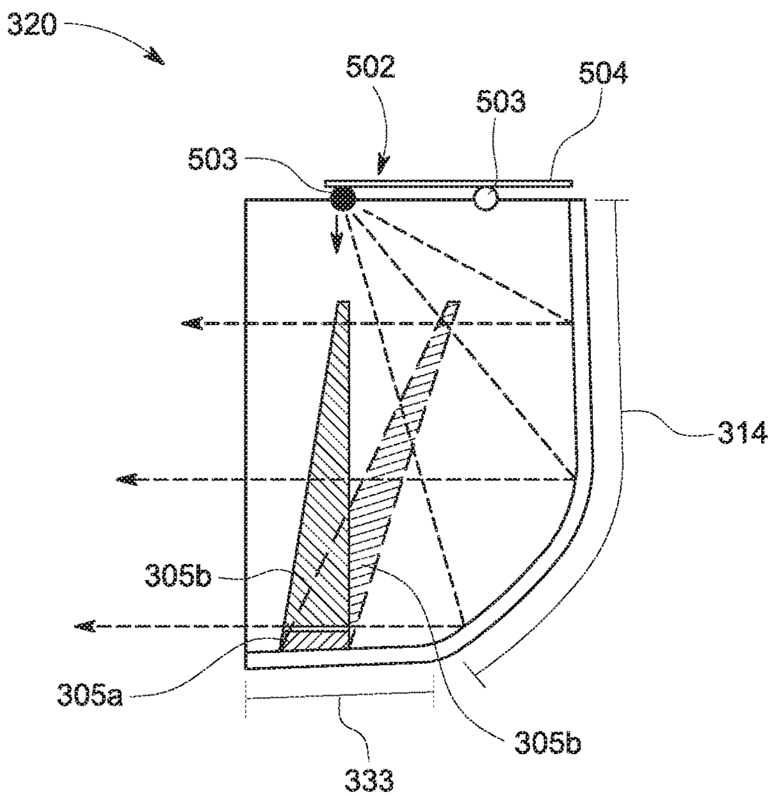
FIG. 9 shows a left side view of an arrangement of a reflector, an inner lens and a light source of a lighting device structure in a second structure according to the principle of the present invention.

FIGS. 7B-9 show a further embodiment of the lighting device structure 15 according to the principle of the present invention wherein FIG. 7B shows a sectional view of an embodiment of the invention; FIG. 8 show a side front perspective of an arrangement of the low beam device 320, the inner lens 305 and upper lighting source 502 of and embodiment of the lighting device structure 15 according to the principle of the invention; FIG. 9 shows a left side view of an arrangement of the low beam device 320, the inner lens 305 and the upper lighting source 502 of the lighting device structure of FIG. 9.

According to this embodiment, the lighting device structure 15 comprising lighting sources as the LED lighting elements 503 and 505 configured to provide lighting illumination, the reflector 302 configured to reflect lighting illumination from the lighting sources. The inner lens 305 mounted to the reflector 302. The lighting sources, the reflector 302, the inner lens 305 are housed within the housing 304 and the outer lens 306 assembled to the housing 304. The low beam device 320 of this further embodiment comprising the upper lighting source 502, the reflector 302 that comprising the reflecting surface or the upper reflecting portion 314 configured to reflect lighting illumination from the upper lighting source 502, wherein the upper reflecting portion 314 are configured to provide certain functional lighting distribution. In fact, the upper reflecting portion 314 is the main area to reflect light for visibility while riding during day time, low visibility conditions or night time. In this embodiment, the reflector 302 is without the ridge 332. Further, the upper reflecting portion 314 comprises a front bottom end portion 333 integrally formed with the upper reflecting portion 314. Further, the inner lens 305 is mounted to the front bottom end portion 333 of the reflector 302 and illuminates by inducing lighting illumination from upper lighting source 502.

In more detail, as shown in FIG. 7B, the lighting device structure 15 according to this embodiment comprising the housing 304 having the reflector 302, the inner lens 305, the upper lighting source 502 and lower lighting source 506 fitted inside the housing 304 and the outer lens 306 dimensioned to correspond with the dimension and configuration of the housing 304. The lighting device structure 15 in this FIG. 7B is configured in accordance with the principle as with the earlier described embodiments.

According to this embodiment, the inner lens 305 is mounted to the upper reflecting portion 314 that is the main portion for reflecting and making the certain lighting illumination, and has a substantially U-shape and includes the base 305*a* and a pair of arm 305*b*L,R extending from the left and right of the base 305*b* closely reaching toward the upper lighting source 502 projected above. The pair of arms 305*b*L,R lie adjacent to outline wall of the upper reflecting portion 314. Each of the arm 305*b*L,R especially when view from a side view has its outline front-edge of the arm 305*b*L,R slanted inwardly about 45 degrees with regard to the upper reflecting portion 314. Moreover, according to this embodiment, the inner lens 305 is mounted at the front end portion 333 of the reflector 302 which with less lighting distribution and hence the positioning of the inner lens 305 does not affect or obstruct lighting illumination of the upper lighting source 502. Thus, the upper lighting sources 502 can maintain optimum certain lighting illumination as shown in FIG. 9. The pair of arms 305*b*L,R of the inner lens 305 and the low beam Led elements 503 of lighting device structure 15 in this second structure, are not limited in the certain shape, thus the pair of arms 305*b*L,R is adaptable to correspond with position of the low beam LED elements 503 as shown in FIGS. 8 and 9.

As mentioned above, the upper lighting source 502 is projected above the inner lens 305. The upper lighting source 502 according to this embodiment is also a LED lighting source which comprises the upper PCB 504 and a plurality of low beam LED elements 503, for example, three low-beam LED elements 503 are provided as the lighting source. The upper PCB 504 is horizontally arranged at low beam device 320 and above the upper reflecting portion 314 and a plurality of low beam LED elements 503 are facedown to the upper reflecting portion 314 so as to project lighting illumination forward as lighting illumination is reflected by reflector 302. The low-beam LED elements 503 as the upper lighting source 502 leads light onto the inner lens 305 passing a pair of arms 305*b*L,R, such that the inner lens 305 able to illuminate itself structure and hence could be view as auxiliary and/or accessory light.

The lower lighting source 506, according to this embodiment is also a LED lighting source which comprises the lower PCB 508 and a plurality of high beam LED elements 505, for example high-beam LED elements 505, which according to this embodiment three high-beam LED elements 505 are provided to emit high beam light and function as a high-beam light for the motorcycle 100 as the high-beam LED elements projected high-beam light onto the lower reflecting portion 316 of the reflector 302 and reflected therefrom as shown in FIG. 7B.

As it is apparent from the above teaching, by providing alternative lighting device structure according to the principle of the present invention and its various embodiments, it is possible to efficiently and effectively mount the inner lens on the reflector such that the inner lens does not interfere or disturb certain lighting illumination of the light source as set out in the objective of the invention described above.

Although specific embodiments of the invention have been disclosed and described as well as illustrated in the companying drawings, it is simply for the purpose of better understanding of the principle of the present invention and it is not as a limitation of the scope and spirit of the teaching of the present invention. Adaption and modification to various structures such as mounting mechanism of various parts and elements or embodiments are possible and apparent to a skilled person without departing from the scope of the present invention which is to be determined by the claims.

LIST OF REFERENCES

15 lighting device structure
20L,R a pair of handle grips

21L,R a pair of rear-view mirrors
22 clutch lever
23 rear brake lever
24 throttle
30 body frame (main frame)
35 head light
40L,R a pair of front-winker lights
45L,R a pair of headlight side-covers
46L,R a pair of mounting portions (front winker lights)
50 meter
51 meter cover
55L,R a pair of front forks
60 front wheel
65 front axle
70 front tire
75 front disc brake
80 front fender
85 center cover
90 side upper cover
95 side cover
99 garnishes
100 motorcycle
104 air cleaner cover
105 seat
106 seat key cylinder
110 fuel tank
115 engine system
120 fuel inlet
125 fuel lid
130 fuel pump
134 side rear cover
135 side rear upper cover
136 side lower cover
140 seat frame
145 rear grip
150 tail light
155L,R a pair of rear winker lights
160 rear fender
162 inner rear fender
164 rear tire
165 rear wheel
170 license light
175 cylinder bloc
180 air cleaner
185 throttle body
190 cylinder head
195 crank case
200 rear axle
205 exhaust pipe
210 exhaust chamber
215 muffler
220 rear cushion unit
224L,R a pair of passenger steps
226L,R a pair of rider steps
228 chain
229 side stand
250 swing arm
302 reflector
304 housing
305 inner lens
305*a* base (of inner lens)
305*b*R,L arm of inner lens (in second structure)
306 outer lens
308 overlapping portion (of inner lens)
310 mounting boss (on the housing)
311 mounting inlets (on the housing)
312L left mounting arm (on the left headlight side cover)
312R right mounting arm (on the right headlight side cover)
314 upper reflecting portion
316 lower reflecting portion
318 connecting portion (of the reflector)
320 low beam device
322 high beam device
324 mounting recess with a through hole A (on the reflector)
326 mounting recess with a through hole B (on the inner lens)
328 screw
330 mounting wings (on the reflector)
332 vertical ridge
333 front end portion (of the inner lens)
402L,R a pair of overlapping arms (of the inner lens)
404 base (of the inner lens)
406 mounting port (on the inner lens)
408 extension housing holder
410 mounting guide (on the extension housing holder)
412 side mounting flange
414 edge portion (of the outer lens)
416 groove portion (of the housing)
502 upper lighting source
503 low beam LED elements
504 upper printed circuit board (upper PCB)
505 low beam LED elements
506 lower lighting source
508 lower printed circuit board (lower PCB)
600 headlight cover
602 low beam window (on the headlight cover)
604 high beam window (on the headlight cover)
606 groove portion

The invention claimed is:

1. A lighting device structure comprising a lighting source configured to provide lighting illumination, a reflector configured to reflect said lighting illumination from said lighting source, an inner lens mounted to said reflector and illuminated by said light source; wherein said lighting source, said reflector, said inner lens are housed within a housing, and an outer lens assembled to said housing characterized in that said inner lens includes an overlapping arm and is mounted to a front end portion of said reflector, wherein the overlapping arm has a thickness greater and wider than a thickness of the front end portion of said reflector such that the overlapping arm includes an overlapping portion overlapping the front end portion of the reflector; said overlapping portion of said inner lens inducing said lighting illumination for illuminating said inner lens;

further comprising a low beam device and a high beam device;

wherein, said lighting source comprises an upper lighting source and a lower lighting source which provides low beam light and high beam light separately and respectively in upper and lower position to the respective said low beam device and said high beam device; and wherein said overlapping portion of said inner lens is positioned at said low beam device; said inner lens comprising an extending base, which is illuminated by said high beam.

2. The lighting device structure according to claim 1 wherein the said reflector comprises an upper reflecting portion and a lower reflecting portion which reflects said lighting illumination of said upper lighting source and said lower lighting source of said lighting source respectively; said reflector further comprising a connecting portion which separates said upper reflecting portion from said lower reflecting portion.

3. The lighting device structure according to claim 2 wherein said upper lighting source and said lower lighting sources comprise a pair of spaced-apart low-beam LED elements which arranged separately in horizontal direction, and a pair of spaced-apart high-beam LED element which arranged separately same manner as said pair of spaced-apart low-beam LED elements, respectively; and wherein said upper reflecting portion and said the lower reflecting portion further comprise a vertical ridge running vertically at center of said reflector such that said vertical ridge seems to separate said reflector at said upper reflecting portion and said lower reflecting portion into left and right chambers.

4. The lighting device structure according to claim 2, wherein said inner lens and said reflector are mounted to said housing by a single fastening means at said connecting portion of said reflector and at said extending base of said inner lens.

5. The lighting device structure according to claim 4, wherein said lighting device structure further comprise a housing holder configured to conceal clearance between said housing and said lower reflecting portion to hide from view the components and elements installed therein; said housing holder is coupled said inner lens, said reflector and said housing by said single fastening means.

6. The lighting device structure according to claim 1, wherein the said headlight comprise a headlight cover and a pair of headlight side covers dimensioned to cover the front side of said headlight and covering the left and right sides of said headlight cover respectively; said headlight cover structured to define a low beam window and a high beam window and a groove portion forms horizontally to separate said low beam window from said high beam window.

7. The lighting device structure according to claim 1, wherein said lighting source comprises an LED element mounted to a printed circuit board; and wherein said printed circuit board is horizontally arranged above said reflecting portion and said LED element is faced down to said reflecting portion for projecting said lighting illumination forward upon reflected by said reflector.

8. A lighting device structure comprising a lighting source configured to provide a lighting illumination, a reflector configured to reflect said lighting illumination from said lighting source, an inner lens mounted to said reflector; wherein said lighting source, said reflector, said inner lens are housed within a housing, and an outer lens is assembled to said housing; characterized in that said reflector comprises a reflecting portion configured to reflect said lighting illumination and provide certain functional light distribution; and a front bottom end portion integrally formed to said reflecting portion;

and wherein said inner lens is mounted to said front bottom end portion of said reflector and illuminated by said lighting source;

wherein said inner lens includes a base and a pair of arms extending from the left and right of said base reaching toward said lighting source;

further comprising a low beam device and a high beam device;

wherein, said lighting source comprises an upper lighting source and a lower lighting source which provides low beam light and high beam light separately and respectively in upper and lower position to the respective said low beam device and said high beam device; and wherein said overlapping portion of said inner lens is positioned at said low beam device; said inner lens comprising an extending base, which is illuminated by said high beam.

9. The lighting device structure according to claim 8, wherein said lighting source comprises an LED element mounted to a printed circuit board; and wherein said printed circuit board is horizontally arranged above said reflecting portion and said LED element is faced down to said reflecting portion for projecting said lighting illumination forward.

* * * * *